Jan. 6, 1959  H. TRUE ET AL  2,867,208
PORTABLE BARBECUE
Filed May 21, 1954  2 Sheets-Sheet 2
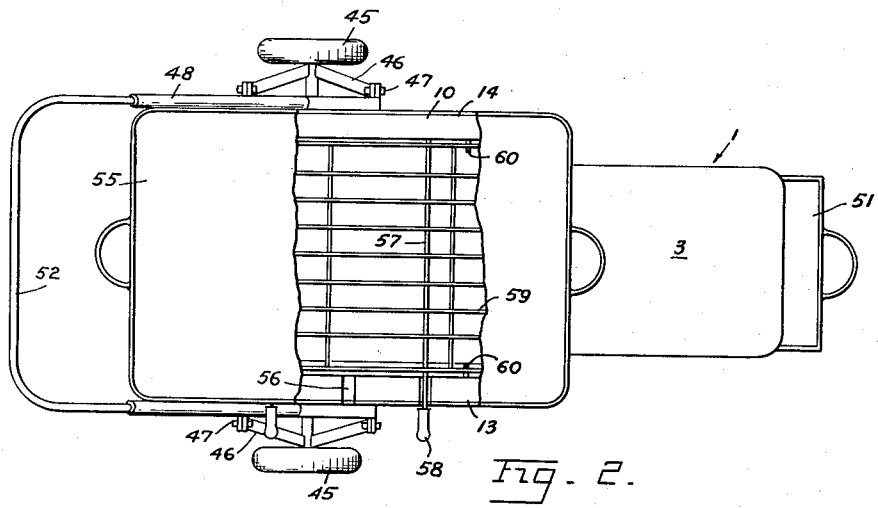
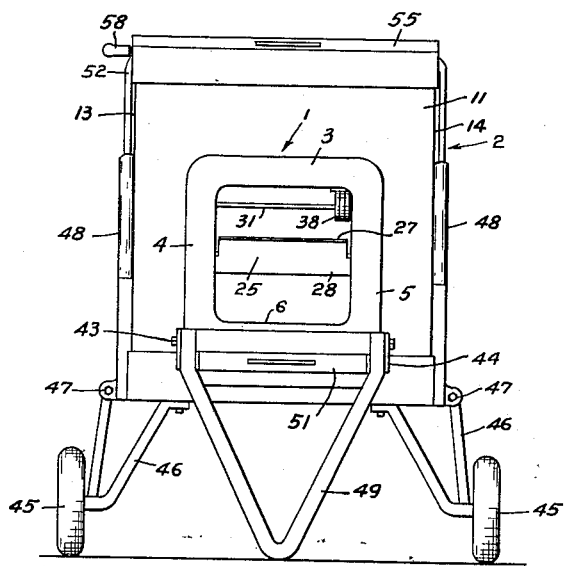 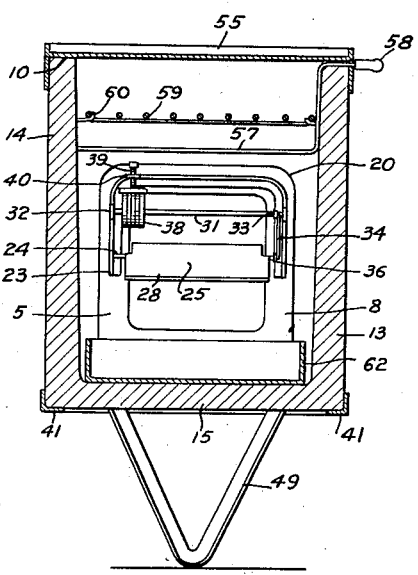
INVENTORS
HARRY TRUE
GORDON DOUGLAS BROWN
BY Alexander Riaboff
ATTORNEY ized

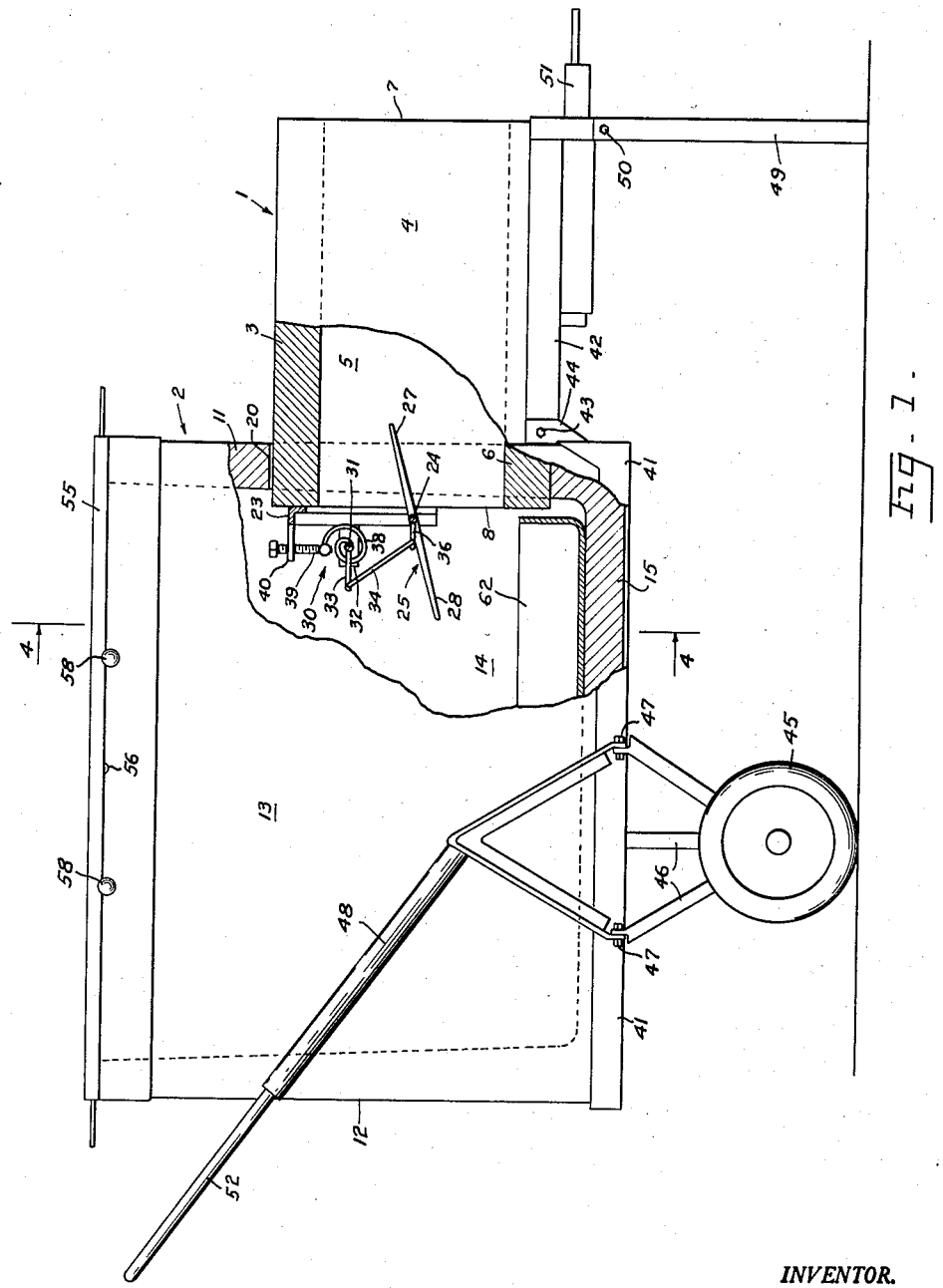

United States Patent Office 2,867,208
Patented Jan. 6, 1959

2,867,208
PORTABLE BARBECUE
Harry True and Gordon Douglas Brown, Vallejo, Calif.

Application May 21, 1954, Serial No. 431,463

2 Claims. (Cl. 126—276)

This invention relates to a portable barbecue.

The object of this invention is to provide a barbecue which can be conveniently moved from place to place, and which can be easily taken apart and the parts thereof placed for storage or transportation inside of the oven, the biggest part of said barbecue.

Another object of this invention is to provide a portable barbecue which has a fire-box, an oven and means for regulating the temperature of hot gases flowing from said fire-box into the oven.

Another object of this invention is to provide a barbecue, the walls of which are made out of insulation material to permit the operation of the same without heat dissipation and the inconvenience caused thereby.

Other objects and advantages will appear as the specification proceeds and the novel features of the device will be particularly pointed out in the claims hereto annexed.

In this specification and the annexed drawing the invention is illustrated in the form considered to be the best but it is understood, that the invention is not limited to such form; and it is also to be understood that in and by the claims following the description, it is desired to cover the invention in whatsoever form it may be embodied.

The invention is illustrated in the accompanying drawings in which:

Fig. 1 is a side elevation of the said barbecue, a portion thereof being broken away to disclose the inner construction of said barbecue.

Fig. 2 is a top plan view, a portion thereof being broken away to disclose the inner construction of said barbecue.

Fig. 3 is a front view of said barbecue, and

Fig. 4 is a section taken along the line 4—4 of Fig. 1.

In detail the barbecue forming the subject matter of this invention consists of a fire-box 1 and an oven 2.

The fire-box 1 consists of a top 3, sidewalls 4 and 5, and a bottom 6, and having its front end 7 and a rear end 8 open. The top 3, the side walls 4 and 5 and the bottom 6 are preferably made of a mixture of four parts of an aggregate sold under the trade name of "Luminite." This mixture is light, strong, fire-resistant and has good heat insulation quality, which permits a person to work with said barbecue without being discomforted by heat.

The oven 2 comprises a box which is open at its top 10 and consists of a front wall 11, back wall 12, side walls 13 and 14, and a bottom 15. The walls 11, 12, 13 and 14 are made somewhat thicker toward the bottom, so that the inner surfaces thereof are slightly inclined toward the center, making the bottom dimensions about 1" shorter than those at the top 10. The oven box 2 is made of the same mixture as the fire box 1.

The front wall 11 of oven box 2 is formed with a hole 20 through which the rear end 8 of the fire-box 1 extends into said oven box.

The rear end 8 carries attached thereto a bracket 23 in form of an inverted U made of angle iron. The bracket 23 rotatably carries a shaft 24 to which is secured a damper 25. The upper part 27 of said damper is slightly narrower than the width of the opening of the fire box 1, so that the part 27 may enter the same. The lower part 28 of said damper is slightly wider than the width of the opening of the fire box 1. The damper 25 is provided for closing the rear end of said fire-box.

Automatic means, such as a thermostatic control 30, is provided for opening and closing the damper 25. The thermostatic control 30 may be of any suitable design and, as shown in the drawings, includes a shaft 31 rotatably supported in ears 32 secured to the brackets 23 above the shaft 24. The shaft 31 carries attached thereto a lever 33, the free end of which is attached to a rod 34. The other end of the latter rod is attached to a damper lever 36 secured to the shaft 24. The rotation of the shaft 31 moves the lever 33 and by means of the rod 34 and the damper lever 36 rotates the shaft 24, thereby closing or opening the damper 25. The shaft 31 is rotated by expansion and contraction of spirals 38, one end of which is anchored to said shaft and the other is secured to a stationary anchor 39 suspended from a support 40 which is attached to said bracket 23.

The thermostatic control 30 operates as follows: Fire is built in the fire-box 1. When the temperature of gases passing through the rear end of the fire-box begins to rise, the expansion of the spirals 38 forces the shaft 31 to rotate and through the lever 33, rod 34 and lever 35 rotates the shaft 24 so that the damper 25 begins to close said rear end, thus cutting the amount of heat introduced into the oven from the fire-box. At a certain predetermined temperature the damper 25 closes the rear end of the fire-box 1 completely. This temperature may be adjusted by changing the position of the anchor 39.

The oven 2 rests on a frame 41, preferably made of angle iron. A frame 42 supports the firebox 1. The frame 41 carries brackets 44 by means of which said frame is attached to the frame 42 by bolts 43.

The frame 41 carries a pair of wheels 45, which wheels with the supporting structure 46, may be disconnected from the frame 41 by removing bolts 47. A handle bar 52 is removably secured to the pipes 48, which are in turn welded or otherwise secured to the frame 41. The handle bar 52 is provided for wheeling the barbecue around. The frame 42 has a rest 49 removably secured thereto by bolts 50.

The firebox carries an ash tray 51 which slides under the firebox 1 on a pair of angle irons 53 secured to the frame 42. Said ashtray is used for emptying ashes thereinto formed in the firebox as the result of combustion. The ash tray is pulled out from under the firebox 1, and the ashes from the firebox are pushed or swept thereinto. The oven 2 is covered by a frying pan 55. The top edge of the oven 2 has several notches 56 into which skewers 57 may be placed. The skewers 57 are bent at a substantially right angle to follow the wall of the oven and then at a right angle again to extend the width of said oven. The ends of said skewers being supported by small dents in the opposite wall. Handles 58 are provided on the outer ends of said skewers for convenience of handling. A grill 59 is supported above said skewers 57 by hooks 60 secured in said vertical walls. A grease pan 62 is placed on the bottom of the oven 2 to catch grease which may drip from meat cooking on said grill 59 or skewers 57.

All the parts of the barbecue are of such size that they can be placed and stored inside of the oven 2, which considerably cuts packing and transportation costs.

We claim:

1. A portable barbecue consisting of a separate oven unit in form of a box having a bottom, side walls, a front wall, a rear wall and an open top, a separate firebox unit having an open front and rear ends, a bottom, a top and side walls, said front wall of the oven having an opening therein into which the rear end of said firebox is placed; a damper carried by the rear end of said firebox, a thermostatic control attached to the rear end of said firebox and located in the oven, said control being operatively connected with said damper for opening and closing the rear end of said firebox upon a decrease or increase respectively of the oven temperature and thereby maintaining a preselected temperature in the oven; a grill for supporting food to be cooked secured in the open top of the oven, and a frame for supporting said oven and the firebox in proper relation.

2. A portable barbecue consisting of the following separate units: a box shaped oven having an open top and closed on the sides, front, rear and bottom; a firebox shaped as a square pipe having its front and rear ends open, said firebox being of such size as to fit inside of said oven; said oven having an opening in its front end into which the rear end of the firebox is inserted to assemble the above mentioned units into a barbecue, a damper secured to the rear of said firebox; a thermostatic control attached to the rear end of said firebox and located in the oven, when said oven and firebox are assembled, said thermostatic control is operatively connected with the damper for swinging the same to close and open the rear end of said firebox upon an increase or decrease respectively of the oven temperature and to control the temperature in the oven thereby; a frame unit for supporting said oven and fireplace in proper relationship when assembled; and a grill unit for supporting food to be cooked removably secured in the open top of the oven.

References Cited in the file of this patent

UNITED STATES PATENTS

| | | |
|---|---|---|
| 11,794 | Sherwood | Oct. 10, 1854 |
| 148,970 | Moore | Mar. 24, 1874 |
| 592,789 | Knights | Nov. 2, 1897 |
| 605,999 | Charroin | June 21, 1898 |
| 1,659,875 | Jacobs | Feb. 21, 1928 |
| 1,711,365 | Summers | Apr. 30, 1929 |
| 1,890,681 | Hoppe | Dec. 13, 1932 |
| 2,187,767 | Akers | Jan. 23, 1940 |
| 2,441,994 | Di Pasquale | May 25, 1948 |
| 2,565,000 | Schultz | Aug. 21, 1951 |
| 2,666,426 | Pollard | Jan. 19, 1954 |

FOREIGN PATENTS

| | | |
|---|---|---|
| 1,945 | Great Britain | of 1911 |